(12) United States Patent
van de Ruit et al.

(10) Patent No.: US 11,316,659 B2
(45) Date of Patent: Apr. 26, 2022

(54) PRIMARY AND SECONDARY BLOCKCHAIN DEVICE

(71) Applicant: Koninklijke KPN N.V., Rotterdam (NL)

(72) Inventors: Douwe van de Ruit, Langerak (NL); Nikos Moustakas, Nootdorp (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 96 days.

(21) Appl. No.: 16/756,357

(22) PCT Filed: Oct. 19, 2018

(86) PCT No.: PCT/EP2018/078753
§ 371 (c)(1),
(2) Date: Apr. 15, 2020

(87) PCT Pub. No.: WO2019/077126
PCT Pub. Date: Apr. 25, 2019

(65) Prior Publication Data
US 2021/0203476 A1 Jul. 1, 2021

(30) Foreign Application Priority Data

Oct. 20, 2017 (EP) ..................... 17197577

(51) Int. Cl.
*H04L 9/06* (2006.01)
*H04L 67/1097* (2022.01)

(52) U.S. Cl.
CPC .......... *H04L 9/0618* (2013.01); *H04L 9/0643* (2013.01); *H04L 67/1097* (2013.01); *H04L 2209/38* (2013.01)

(58) Field of Classification Search
CPC . H04L 9/0618; H04L 9/0643; H04L 67/1097; H04L 2209/38
See application file for complete search history.

(56) References Cited

U.S. PATENT DOCUMENTS

| | | |
|---|---|---|
| 9,774,578 B1 | 9/2017 | Ateniese et al. |
| 10,305,833 B1 | 5/2019 | Dennis |
| 10,554,649 B1 | 2/2020 | Fields |
| 11,139,979 B2 | 10/2021 | van de Ruit |

(Continued)

FOREIGN PATENT DOCUMENTS

| | | |
|---|---|---|
| CN | 105 488 675 A | 4/2016 |
| EP | 3 499 789 A1 | 6/2019 |

(Continued)

OTHER PUBLICATIONS

Adam Back, et al., "Enabling Blockchain Innovations with Pegged Sidechains," (Oct. 22, 2014).

(Continued)

*Primary Examiner* — Arvin Eskandarnia
(74) *Attorney, Agent, or Firm* — Hamilton, Brook, Smith & Reynolds, P.C.

(57) ABSTRACT

Some embodiments are directed to a blockchain management device (100) configured to distribute a new block of a secondary blockchain to at least one further blockchain management device that manages the secondary blockchain, and to distribute a transaction to at least one blockchain management device that manages a primary blockchain, said transaction comprising an identification of a set of transactions in the new block.

18 Claims, 9 Drawing Sheets

(56) References Cited

U.S. PATENT DOCUMENTS

| | | |
|---|---|---|
| 2016/0028552 A1 | 1/2016 | Spanos |
| 2016/0330034 A1 | 11/2016 | Back et al. |
| 2017/0005804 A1 | 1/2017 | Zinder |
| 2017/0031676 A1 | 2/2017 | Cecchetti et al. |
| 2017/0046698 A1* | 2/2017 | Haldenby ............. H04L 9/0861 |
| 2017/0116693 A1* | 4/2017 | Rae .................... G06Q 20/3827 |
| 2017/0163733 A1 | 6/2017 | Grefen et al. |
| 2017/0230189 A1 | 8/2017 | Toll et al. |
| 2017/0295157 A1 | 10/2017 | Chavez et al. |
| 2017/0323294 A1 | 11/2017 | Rohlfing |
| 2017/0331896 A1 | 11/2017 | Holloway et al. |
| 2017/0344988 A1 | 11/2017 | Cusden |
| 2018/0089436 A1* | 3/2018 | Smith .................... G06F 21/575 |
| 2019/0026821 A1 | 1/2019 | Bathen et al. |
| 2019/0058719 A1 | 2/2019 | Kar |
| 2019/0130387 A1 | 5/2019 | Arora et al. |
| 2019/0190719 A1 | 6/2019 | van de Ruit et al. |
| 2020/0258085 A1 | 8/2020 | Moustakas |
| 2020/0389294 A1 | 12/2020 | Soundararajan |

FOREIGN PATENT DOCUMENTS

| | | |
|---|---|---|
| WO | WO 2019/072670 A1 | 4/2019 |
| WO | WO 2019/077126 A1 | 4/2019 |

OTHER PUBLICATIONS

Solidity Documentation Release 0.4.19, Ethereum (Dec. 2017).

Ateniese, G et al., "Redactable Blockchain-or-Rewriting History in Bitcoin and Friends," 2017 IEEE European Symposium on Security and Privacy, IEEE, pp. 111-126 (Apr. 26, 2017).

International Search Report and Written Opinion for Int'l Application No. PCT/EP2018/078753, titled: Primary and Secondary Blockchain Device, dated Dec. 11, 2018.

Tschorsch. F., et al., "Bitcoin and Beyond: A Technical Survey on Decentralized Digital Currencies," International Association for Cryptologic Research, vol. 20150517:090557, May 15, 2015.

Extended European Search Report, EP Application NO. 17197577.4 dated Apr. 6, 2018.

* cited by examiner

300

301

302

303

PRIMARY AND SECONDARY BLOCKCHAIN DEVICE

This application is the U.S. National Stage of International Application No. PCT/EP2018/078753, filed on Oct. 19, 2018, which designates the U.S., published in English, and claims priority under 35 U.S.C. § 119 or 365(c) to European Application No. 17197577.4, filed on Oct. 20, 2017. The entire teachings of the above applications are incorporated herein by reference.

FIELD OF THE INVENTION

The invention relates to a blockchain management device, a blockchain use device, a blockchain verification device, a blockchain management method, a blockchain use method, a blockchain verification method, and a computer readable medium.

BACKGROUND

Blockchains are a novel technology that allows distributed management of transactions while at the same time maintaining trust in those transactions. The latter may also be done in a distributed manner. A blockchain is a list of records, which are called blocks, which are linked. Each block contains a pointer as a link to a previous block. Multiple parties can record transactions in the blockchain or verify previous transactions of others. The blockchain is sometimes referred to as a (distributed) ledger.

An example of a known blockchain system is given in US Patent Application 20170031676, "Blockchain Computer Data Distribution" (included herein by reference). The known system discloses various uses of such blockchains. For example, blockchains are used in cryptocurrency systems. For example, cryptocurrency transactions for a period may be stored in a block that is then added to the tail of the blockchain, thereby extending the blockchain. The history of the cryptocurrency can be accessed by moving along the blocks of the blockchain. The blockchain could be held privately, e.g., in a centralized manner, or held publicly in a less centralized manner. The latter is usual for cryptocurrencies.

Another example, is the distribution of patches to IoT devices through a blockchain environment. In the blockchain environment, blocks, which can hold data, are chained together by storing information in a block which indicates the preceding block. A block can further comprise timestamp information and validation information.

Recently a lot of new blockchain related implementations are created. These implementations provide all kinds of new ways of making transactions between multiple parties, e.g., based on bitcoin or bitcoin type blockchains. Other implementations make use of the immutability characteristic of the blockchain technologies, for example to enable a secure and tamper-proof notary system. From the perspective of the user the blockchain world is changing from clear to cluttered. This imposes new problems, e.g., where multiple blockchains exist in parallel, a verification mechanism is missing to verify the integrity of the data.

SUMMARY OF THE INVENTION

As the blockchain technology evolves, the number of blockchains grows fast. Not only public blockchains, but also private blockchains. Furthermore, the number of applications to which the blockchains may be applied is steadily increasing. The user may thus be confronted with various blockchains for various applications. Not all of these blockchains may be particularly well-known, used by many users, or see a lot of traffic. As a result, the user is in need of an additional way to verify the reliability of a particular blockchain. Apart from verifying the data that is present on a blockchain, a user may also need a reliable way to verify that a blockchain is still being maintained.

A blockchain management device as defined in the claims addresses these concerns. The blockchain management device maintains a secondary blockchain, but records the creation of blocks of the secondary blockchain on a different blockchain: the primary blockchain. The primary blockchain may be maintained by a different device, or devices, and in fact by an entirely different organization. Thus, the user, who may know little of the organization supporting the secondary blockchain, can verify the creation of blocks on the secondary blockchain by inspecting the primary blockchain. Moreover, if the user is unsure if the secondary blockchain is still being maintained, he can verify by inspecting the primary blockchain if blocks are still being created, even if, for some reason, new blocks of the secondary blockchain fail to reach him. Note that the overhead of posting an identification in the primary blockchain is much smaller than, e.g., reposting the entire new block of the secondary blockchain in the new block.

In an aspect of the invention, the blockchain management device produces new blocks according to a predictable schedule, which may be synchronized with the primary blockchain. This gives even better assurances to the user that the secondary blockchain is still being maintained, since by waiting until the predictable time, the user can verify if any block of the secondary blockchain is recorded on the primary blockchain.

An aspect of the invention concerns a blockchain verification device as defined in the claims. The blockchain verification device validates a blockchain, and in particular the transactions on the primary blockchain that refer to blocks on the secondary blockchain. For example, the blockchain verification device may verify that each secondary block indeed has a corresponding transaction on the primary blockchain, and/or that each such transaction on the primary blockchain indeed corresponds to a block on the secondary blockchain. If the system is arranged not to register a transaction on the primary blockchain for each secondary block, then the verification device may be correspondingly adapted.

An aspect of the invention concerns a blockchain use device arranged to receive a transaction and obtain part of a blockchain, e.g., a block thereof, to verify the transaction.

The blockchain management, verification and use devices are electronic devices. For example, they may be a mobile electronic device, in particular the blockchain use device may be a mobile phone. The blockchain management, verification and use devices may, e.g., be a set-top box, computer, etc.

The methods for blockchains described herein may be applied in a wide range of practical applications. Such practical applications include: crypto currencies, transfer systems such as digital notaries implemented on a blockchain, domain management using blockchains, etc. The invention may also be applied in situations in which no transfer is done. For example, in data recording applications, e.g., for recording sensor values and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a blockchain system including a blockchain management device, FIG. 2a schematically shows an example of an embodiment of a blockchain, FIG. 2b schematically shows an example of an embodiment of a block, FIG. 2c schematically shows an example of an embodiment of a block, FIG. 2d schematically shows an example of an embodiment of a blockchain, FIG. 2e schematically shows an example of an embodiment of a blockchain, FIG. 2f schematically shows an example of an embodiment of a blockchain, FIGS. 3a, 3b, 3c and 3d schematically shows an example of an embodiment of a blockchain system, FIG. 4 schematically shows an example of an embodiment of a blockchain verification device FIG. 5 schematically shows an example of an embodiment of a blockchain use device FIG. 6a schematically shows an example of an embodiment of a blockchain management method, FIG. 6b schematically shows an example of an embodiment of a blockchain use method, FIG. 6c schematically shows an example of an embodiment of a blockchain verification method, FIG. 7a schematically shows a computer readable medium having a writable part comprising a computer program according to an embodiment, FIG. 7b schematically shows a representation of a processor system according to an embodiment.

| List of Reference Numerals in FIGS. 1-5, 7a-7b: | |
|---|---|
| 100 | a secondary blockchain management device |
| 110 | a communication interface |
| 120 | block constructor |
| 125 | primary blockchain transaction unit |
| 130 | consensus prover |
| 140 | a hash unit |
| 150 | a computer network |
| 151, 152 | blockchain use device |
| 160 | a further secondary blockchain management device |
| 170 | a blockchain verification device |
| 180 | a blockchain system |
| 190 | a primary blockchain management device |
| 200 | a blockchain system |
| 210 | a primary blockchain |
| 250 | a secondary blockchain |
| 211-215 | a block |
| 251-253 | a block |
| 220 | a block |
| 230 | a block |
| 221, 231 | a reference to a preceding block |
| 222, 232 | multiple transactions |
| 223, 233 | a consensus proof |
| 224, 234 | a block id |
| 235 | a transaction |
| 300 | a blockchain system |
| 301 | a first level |
| 302 | a second level |
| 303 | a third level |
| 310-370 | a blockchain |
| 381-383 | a blockchain |
| 391-394 | a blockchain |
| 400 | a blockchain use device |
| 410 | a communication interface |
| 420 | first block obtainer |
| 422 | second block obtainer |
| 430 | transaction verifier |
| 500 | a blockchain verification device |
| 510 | a communication interface |
| 520 | a verification unit |
| 570 | a blockchain storage |
| 1000 | a computer readable medium |
| 1010 | a writable part |
| 1020 | a computer program |
| 1110 | integrated circuit(s) |
| 1120 | a processing unit |
| 1122 | a memory |
| 1124 | a dedicated integrated circuit |
| 1126 | a communication element |
| 1130 | an interconnect |
| 1140 | a processor system |

DETAILED DESCRIPTION OF PREFERRED EMBODIMENTS

Figure 1:
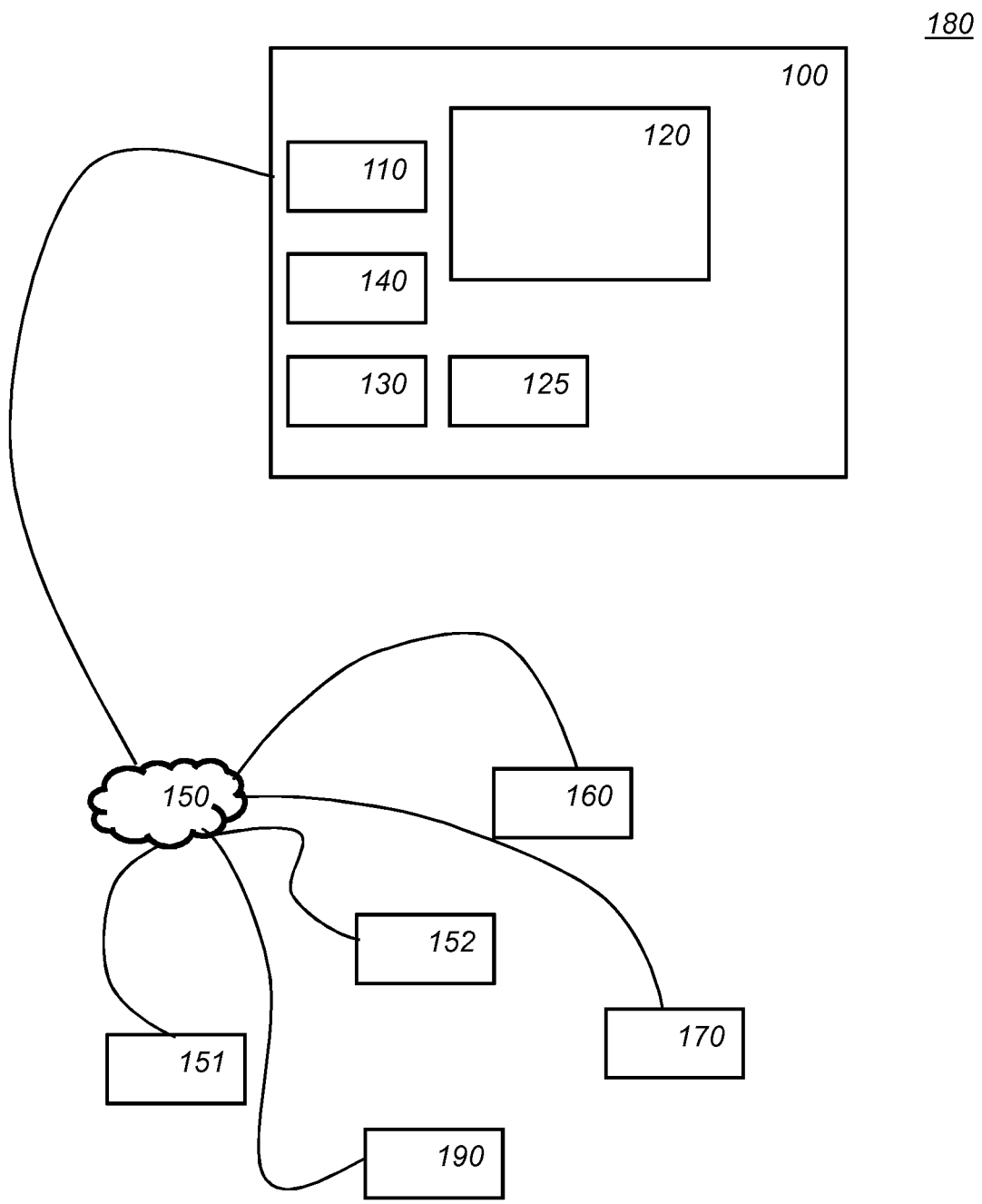

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

FIG. 1 schematically shows an example of an embodiment of a blockchain system 180 including a blockchain management device 100. The system may include various different entities. Included in system 180 may be one or more blockchain management devices; shown are blockchain management devices 100, and 160, which are arranged to add one or more blocks to a secondary blockchain. System 180 uses at least two blockchains, referred to as the primary blockchain and secondary blockchain. Transactions are recorded on the secondary blockchain. Some events on the secondary blockchains are recorded on the primary blockchain. For example, adding a new block to the secondary blockchain is recorded on the primary blockchain. This feature allows increased verification of the secondary blockchain. In recent years the number of different blockchains has increased rapidly. It has become increasingly harder to verify the trustworthiness of a particular secondary blockchain. However, by recording some features of the secondary blockchain on a primary blockchain, at least these aspects may be verified. For example, a user may have a high trust in the immutability of some particular primary blockchain, e.g., the primary blockchain may be a well-known blockchain such as the bitcoin blockchain, the Ethereum blockchain, etc. Other advantages and applications are discussed further below. There may be multiple blockchains organized hierarchically, wherein a blockchain at a lower hierarchical level record events in a blockchain on a higher hierarchical level, e.g., on the immediately higher level. The highest level blockchain may be referred to as the root blockchain. The primary blockchain may be the root blockchain.

For example, a lower level blockchain, say the secondary blockchain may be a private blockchain, e.g., for a particular application, a particular company, community or the like, whereas the primary blockchain may be a public blockchain, e.g., the Ethereum blockchain, etc.

FIG. 1 also shows a blockchain management device 190 which is configured to add blocks to a primary blockchain. There may be more than one or two blockchain management devices. For example, there may be more blockchain management devices responsible for the primary or secondary blockchain. There may be devices which are configured both for the primary and secondary blockchain; in other embodiments though a blockchain management device either manages the primary or secondary blockchain but not both. When necessary we will refer to a blockchain management device that adds blocks to a secondary blockchain as a secondary blockchain management device, and a blockchain management device that adds blocks to a primary blockchain as a primary blockchain management device. If observations relate to both type, or the type is clear from the context the classifier primary/secondary may be omitted.

Included in system 180 may further be one or more blockchain use devices. Shown in FIG. 1 is blockchain use device 150 and blockchain use device 151. The blockchain use devices use the blockchain for some purpose, and may, e.g., generate transactions for inclusion in a future block of the blockchain, or may obtain part of the blockchain to at least partially verify a previous transaction. For example, if the blockchain is used for a cryptocurrency, a blockchain use device may verify that a particular transaction is valid and/or transfer or receive some amount of the crypto currency. There may be more or less blockchain use devices than shown in FIG. 1. An example, of a blockchain use device 400 which may be, e.g., employed in system 180 is further disclosed below.

The use devices may also be used to store other transactions than currency transaction, e.g., the transactions may report the transfer of goods. The transactions need not necessarily involve two parties, for example, a transaction may record data on a blockchain, e.g., sensor data and the like.

The computer network 150 may be a peer-to-peer network. For example, messages in system 180 may be sent to part of the devices in system 180, who then forward the message to further devices of system 180. Peer to peer networking may increase the resiliency of the computer network, but it is not necessary. For example, the devices, e.g., the block management devices, may be programmed with one or more computer network addresses of the other devices in the system, e.g., of the other blockchain management devices.

System 180 may comprise one or more blockchain verification devices. Shown in FIG. 1 is blockchain verification device 170. A blockchain verification device verifies at least part of the blockchain. There may be more or fewer blockchain verification devices than shown in FIG. 1. An example, of a blockchain verification device 500 which may, e.g., be employed in system 180 is further disclosed below. A blockchain verification device may verify a primary blockchain, a secondary blockchain or both.

Some or all of the devices of system 180 may be integrated. For example, a blockchain verification device may be separate from a blockchain management device, e.g., to distribute these functions over different computers which may even be distributed geographically. However, a blockchain verification device may also advantageously be integrated with a blockchain management device. A blockchain verification device may also be integrated in a blockchain use device, e.g., to perform a more extensive verification at the use device.

A blockchain management device may also be integrated with a blockchain use device. In this case, the device that produces transactions may also be capable of processing such transactions. This has the advantage that blockchain management, e.g., of generating a new block is distributed over more devices.

The various devices of system 180 communicate with each other over a computer network 150. The computer network may be an internet, an intranet, a LAN, a WLAN, etc. Computer network 150 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 180 as needed. For example, the connection interface may comprise a connector, e.g., a wired connector, e.g., an Ethernet connector, or a wireless connector, e.g., an antenna, e.g., a Wi-Fi, 4G or 5G antenna. For example, blockchain management device 100, blockchain verification device 500 and blockchain use device 400 may comprise communication interface 110, 510 and 410 respectively. Computer network 150 may comprise additional elements, which are not separately shown in FIG. 1, e.g., a router, a hub, etc. In blockchain management device 100, the communication interface 110 may be used to receive transactions for recording in a blockchain. Transactions may be digital transactions, e.g., received in electronic form.

A blockchain management device, such as blockchain management device 100, may comprise a block constructor 120, a consensus prover 130 and a hash unit 140. Blockchain management device 100 may also comprise a storage, e.g., to store the secondary blockchain. The stored secondary blockchain may be used to verify received transactions. The storage may also store the primary blockchain.

Figure 4:
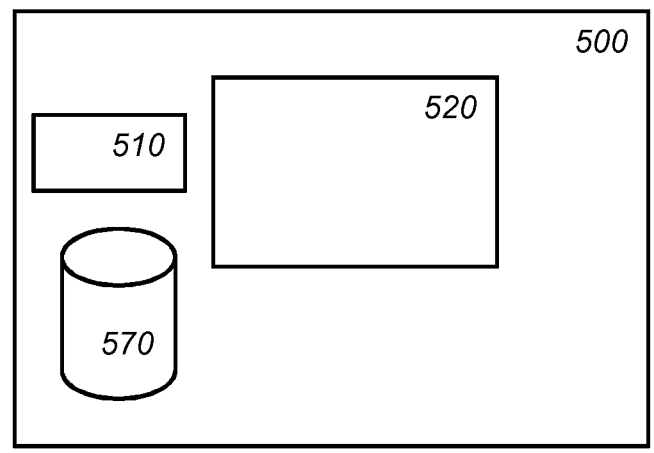
Figure 5:
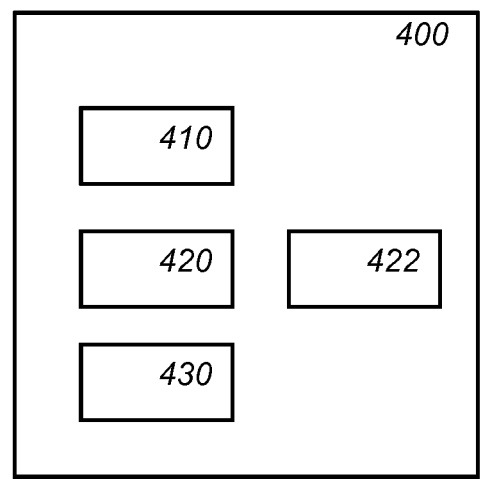

The execution of the blockchain management device 100, but also of, blockchain verification device 500, and blockchain use device 400 is implemented in a processor circuit, examples of which are shown herein. FIG. 1, in particular blockchain management device 100, FIG. 4 and FIG. 5 show possible functional units that may be functional units of the processor circuit. For example, FIGS. 1, 4 and 5 may be used as a blueprint of a possible functional organization of the processor circuit. The processor circuit is not shown separate from the units in FIGS. 1, 4 and 5. For example, the functional units shown in FIGS. 1, 4 and 5 may be wholly or partially implemented in computer instructions that are stored at device 100, 400 and 500, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on the device.

Block constructor 120 may be used to construct, e.g., compute, a new block of the secondary blockchain. Over communication interface 110, transactions are received from other elements in system 180, e.g., from blockchain use devices 150 or 151. Block constructor 120 collects a multiple of the received transactions, e.g., it selects them. For example, block constructor 120 may select all transactions that are received in a period. For example, block constructor 120 may prioritize certain transactions, e.g., by type, by origin, etc. Block constructor 120 may also verify the validity of the transactions. For example, in an embodiment in which transactions are signed, block constructor 120 may verify the signatures, and, e.g., discard invalid transactions. Verification and/or selection may be offloaded to a verification device.

In addition to collecting the multiple transactions, the block constructor 120 obtains other parts of the new block, e.g., a consensus proof and a reference to a previous block on the secondary blockchain. The new block is then assembled from at least the multiple transactions, the consensus proof, and a reference to a preceding block on the blockchain. For example, the reference may be to a last block, e.g., the tail block, of the current blockchain. For example, the current secondary blockchain may be stored on a storage of the blockchain management device, although this is not needed. The new block is then communicated to one or more other elements of system 180. The new block is distributed, e.g., to at least further blockchain management device 160.

Consensus prover 130 is arranged to generate a consensus proof over the selected transactions. For example, blockchain management device 100 may comprise an optional hash unit 140 arranged to compute a hash value s over the selected transactions. Hash unit 140 may be configured for a known cryptographic hash function. For example, a hash function from the SHA family, e.g., SHA-256.

The consensus proof may then be computed over the computed hash value or directly over the transactions. Any of the known consensus proofs may be adapted for an embodiment, for example, the consensus proof may comprise a proof of work. For example, the consensus proof may comprise a string x so that a hash function computed over string x and the hash s, e.g., h(x|s), has a particular form, e.g., is below some difficulty target. For example, the consensus proof may comprise consensus from some portion of the network, e.g., it may comprise signatures of one or more further blockchain management devices, e.g., secondary blockchain management devices. For example, consensus prover 130 may be arranged to obtain said digital signatures from the other secondary blockchain management devices over the digital network. For example, the consensus proof may be required to comprise a signature of at least 51% or more of the secondary blockchain management devices. Such signatures may be obtained over the computer network 150. The consensus proof may also require some mix of signatures from secondary and primary blockchain management devices, e.g., 51% of the secondary blockchain management device, and at least 1, or at least 2, etc., of the primary blockchain management devices.

Once the block for the secondary blockchain is completed it may be distributed over system 180, e.g., in a peer to peer fashion. Other blockchain management or verification devices may verify the block and include it in their blockchain. Once new blocks are added to the secondary blockchain which refer to the new block, the trust in the new block is increased, as it becomes increasingly harder to replace the new block with another block. This feature also resolves races. Even if parts of system 180 may adopt one new block while another part adopts another, in time this will be resolved, e.g., using the longest chain rule.

In blockchains the longest chain rule allows nodes, e.g., blockchain management devices to resolve races. It may happen that two blockchain management devices add a block to the blockchain independent from each other. The blockchain thus splits, becoming in essence a block tree. It may even happen that yet further blocks are added, or even further splits. The longest chain rule prescribes which of the blocks become the new blockchain: the active chain is the longest path from the genesis block to a leaf node, e.g., a block at the bottom of the block tree. This chain represents the most accumulated consensus, e.g., the most work. The consensus mechanism makes sure that the chance that two nodes disagree about blocks in the past decreases as the blocks are older. For example, when a new block arrives, and it extends the previous active chain, a blockchain management device may append it to the active chain. If it does not extend the previous active chain, it depends on whether the branch it does extend has more consensus, e.g., more work, e.g., more blocks, than the currently active chain. If not, the block is stored but the current chain is kept active. If it does have more work, a so-called reorganization is done: deactivating blocks from the old branch, and activating blocks from the new branch.

As said, once the new block is finished, e.g., when a consensus proof is available it is distributed, e.g., through communication interface 110, e.g., initiated by block constructor 120 to other devices of blockchain system 180. For example, the new block will be sent to other blockchain management devices, such as blockchain management device 160. However, the new block will eventually reach all interested parties, e.g., verification devices, etc. Here the new block will become part of the secondary blockchain; that is unless it is rejected by the system for some reason, e.g., as a result of the longest chain rule.

Blockchain management device 100 further comprises a primary blockchain transaction unit 125. Transaction unit 125 is configured to generate a transaction that comprises an identification of the new block, and in particular of the set of transactions. Transaction unit 125 distributes the transaction to at least one blockchain management device that manages a primary blockchain, e.g., to primary blockchain management device 190. Note that the overhead of posting an identification in the primary blockchain is much smaller than, e.g., reposting the entire new block of the secondary blockchain in the new block.

There are several ways in which the identification for the transaction can be computed. For example, the transaction can comprise an identifier of the new block. For example, the new block may comprise an identifier, e.g., generated by block constructor 120, which may also be comprised in the identification. It is preferable, if the identification is also linked to the transactions in the new block, but not the whole block. For example, in an embodiment, transaction unit 125 is configured to compute a hash, e.g., using hash unit 140 over the new block. The identification may comprise the hash. Alternatively, or additionally, the identification may comprise a hash over the transactions in the new block. An advantage of this identification is that the block is positively identified and cannot be modified in any way. In an embodiment, the identification or at least part thereof is also included in the new block itself. This is possible, for example, if the identification is built from part of the new block and/or from data in a previous block. In an embodiment, the identification is also computed over the consensus proof. For example, the identification may be a hash of set of the transactions, the consensus proof and possibly other metadata, such as an identifier of the new block, an identifier of the block management device etc. The identification may still be included in the new block, since the identification is not computed over the entire new block.

In an embodiment, the identifier comprises a first hash over all or part of the new block, and a second hash. The second hash ensures that the identifier is unique even if exactly the same transactions are processed in a new block as in a previous block. For example, the second hash may be a hash over the previous second hash, e.g., the second hash of the previous block. For example, the second hash may be a hash over the first hash and the previous second hash.

In an embodiment, the identification is computed, e.g., over a hash, over a previous block or more than one block back in the blockchain. For example, the identification may comprise a hash over the previous block, and/or the block before that. For example, there may be a number (e.g., n), say 2, or 3, or more, etc., so that the identification comprises a hash of each of the number (n) of previous blocks in the blockchain. In an embodiment, the identification comprises a Merkle tree of the new block of the secondary blockchain.

Primary blockchain management device 190 is configured to manage a primary blockchain. In an embodiment, a primary blockchain management device comprises a communication interface arranged to receive digital transactions for recording in a primary blockchain; for example, the transactions may be received from secondary blockchain management devices. For example, at least one of the blocks may comprise an identification as explained above. Optionally, the primary blockchain management device may also receive the corresponding new block itself, e.g., so that the transaction can be verified. Typically, the new block will not be reposted on the primary blockchain device though.

a processor circuit configured to obtain a consensus proof for a set of transactions received over the communication interface, assemble a new block for inclusion in the primary blockchain, the new block comprising the set of transactions, the consensus proof, and a reference to a previous block on the primary blockchain; optional, the device may optionally verify that the block represented by a transaction is correct, e.g., satisfies the legality criteria of the secondary blockchain, e.g., the consensus proof is correct.

distribute the new block over the communication interface to at least one further blockchain management device that manages the primary blockchain.

The primary blockchain management device will include the transaction in a new block of the primary blockchain. This means that a verifier of the secondary blockchain can verify the secondary blockchain in two ways. First of all, the verifier can verify the secondary blockchain in the usual way; for example, the verifier can verify that the blockchains have correct consensus proofs and that each block in the blockchain correctly refers back to its previous block, up to the genesis block. However, the verifier can also verify that the creation of the blocks was recorded in the primary blockchain. For example, the verifier can verify that the block of the secondary bock is reflected in a transaction on the primary blockchain, and that they are in the correct order, or at least approximately in the correct order, e.g., within a threshold of the correct order. The primary blockchain has an even higher assumption of immutability, and so this improves the trustworthiness of the secondary blockchain.

For example, consider two parties: Bob and Alice, who make a transaction. The transaction is sent to a secondary blockchain management device. The transaction will be included in a new block of the secondary blockchain probably together with many other transactions. Once the block is completed, e.g., the consensus proof is completed, and the new block is distributed, e.g., at least among other secondary blockchain management devices. The transaction that proves that the new block was completed is distributed to a primary blockchain management device, who will include the transaction in a block on the primary blockchain. If later a verification device or a use device needs to verify that the transaction took place, the device can verify the block of the secondary blockchain in which the transaction is recorded and/or the block of the primary blockchain in which the block is recorded.

In an embodiment, the transaction is signed by a public key of the blockchain management device. In an embodiment, the secondary blockchain management device receives payment for one or more or each of the transactions in the new block, e.g., in the form of a crypto currency, the secondary blockchain device may transfer part or all of this payment to the primary blockchain management device that validates his block.

One of the advantages of using a primary blockchain is that a user of the secondary blockchain who is unsure if the secondary blockchain is still being maintained can verify in the primary blockchain if recently blocks have been added to the secondary blockchain. This mechanism may for example be used for private blockchains, which may not be updated frequently. Consider for example, a user of the secondary blockchain who fails to receive new blocks on a secondary blockchain. The user may not be sure if no new block reaches him because of a problem in distribution in the secondary blockchain or because no new block has been created. This can be further improved if verifier has a way to know when a new block in the secondary blockchain ought to have been created. For example, in an embodiment, the distribution of new blocks in the secondary blockchain is synchronized to the distribution of new blocks in the primary blockchain.

For example, the blockchain system 180 may be organized so that, say, for every a blocks on the primary blockchain, b blocks are added to the secondary blockchain. For example, interesting embodiments are, a=b=1, in which the two blockchains are synchronous. This embodiment has the advantage that each block of the secondary blockchain can be verified in the primary blockchain. Moreover, when a primary block is distributed without a secondary block there may be a problem with the secondary blockchain. For example, a may be larger than b, e.g., b=1, say for every 10 blocks on the primary blockchain 1 block, or at least 1, on the secondary blockchain is posted. This embodiment has the advantage that the secondary blockchain, e.g., a small, private, and/or little used blockchain, can run slower than the primary blockchain. For example, b may be larger than a, e.g., a=1, say for every 10 blocks on the secondary blockchain 1 block, or at least 1, on the primary blockchain is posted. This has the advantage that overhead on the primary blockchain is reduced. A verifier may need to verify most blocks, e.g., 9 out of 10, using only the protection mechanism of the secondary blockchain, but getting a confirmation every 10 (or a/b) blocks from the primary blockchain.

Synchronization may be based on time. For example, in the primary blockchain new blocks may be distributed every 10 minutes. The second chain can distribute also every 10 minutes but in a different phase. This works best if the consensus proof has a deterministic time. For example, a consensus proof which is signature based can be used for this purpose, although proof of work based proofs can also be used.

In an embodiment, the data of every block of the secondary blockchain is hashed and the hash code is then added in the primary blockchain as a transaction. This may be done in a sequential manner if the secondary blockchain follows the timers (creation of new blocks) of the primary blockchain.

In an embodiment, an expected time to obtain a consensus proof for the primary blockchain is larger than the expected time to obtain a consensus proof for the secondary blockchain. Synchronizing between the two blockchain may not work perfectly if the consensus mechanism is based on proof of work; but this problem can be alleviated by making sure proof of work for the secondary chain is obtained quicker. Note that for most applications it is not a problem if there is an occasional loss of synchronization; simply waiting a while will resolve the problem. For example, a proof of work based consensus proof may work as follows. The primary and secondary blockchains are associated with a first and second difficulty target respectively. The expected time to obtain a proof work depends on the difficulty target. The first and second difficulty target may be arranged so that the expected time to obtain a proof of work for the primary blockchain is larger than the expected time to obtain a proof of work for the secondary blockchain. For example, a secondary blockchain device may obtain the difficulty target from the secondary blockchain by calculating how quickly new blocks are computed with the current difficulty target, e.g., on average, and increasing or decreasing the difficulty accordingly.

The synchronization may instead or in addition be arranged by arranging the secondary blockchain management device, e.g., block constructor 120 to broadcast a time before which a new block will be created, distribute a new block before the broadcasted time over the communication interface to the at least one further blockchain management device that manages the secondary blockchain, distribute a transaction at the time to the at least one blockchain management device that manages a primary blockchain.

For example, the time may be broadcasted by including the time in the new block. This instructs the other secondary blockchain management devices when a new block needs to be produced. Preferably, the broadcasted time is set well after the time a new block is expected anyway. Alternatively, the blockchain may have a set of associated rules, which include the time, so that it does not need to be broadcast. For example, the new block may be expected at least after some fixed time after the previous bock. For example, a timer could be communicated after agreement by the majority of miners, e.g., every miner who produces a new block broadcasts also the features/parameters it supports.

For example, in an embodiment, a blockchain management devices computes the time in which the past n blocks, say the last 10 blocks, were computed, and divides it by n to compute an average delay for the next block. The next block time may be set to say, the average time times a ratio. For example, the standard deviation of the delay in the last n may be computed. The next block time may then be set as the average delay plus a number of times, e.g., a predetermined number of times, the standard deviation, say, plus 6 standard deviations. This system has the advantage that the next block time can be computed from the blockchain and does not need any additional transmission. Moreover, the next time for the next block adapts to the frequency with which new blocks are created.

It may happen that a blockchain management device has not yet received a new block from other blockchain management devices before the next block time is reached, nor any transactions with which to build a new block. In this case, a new block may be assembled without valid transactions, e.g., a default block. It may be the case that the secondary blockchain management device was cut off from the rest of the blockchain system 180, for some reason, e.g., a faulty network. A result of this is that default blocks may be created without need. In fact, multiple such blocks could be created. If at some point the network problem is resolved, these default blocks may be released into the blockchain system. Interestingly, this will not cause a problem. If the rest of the system worked at it should, new blocks were created at the usual rate. As a result of the longest chain rule the unneeded default blocks will thus be ignored, since they likely form a shorter chain than the regular blocks. Even if some close timing might result in a default blocks being accepted even though another blockchain management device produced a regular block with some regular transaction in it, this need not be a problem. Although the block may be discarded, a new block will be created with the same transactions, but referring to the default block. One may alternatively impose the rule that regular blocks take precedence over default blocks, if the default block does not have a regular block coming after it yet.

It may happen that more than one blockchain management device decides to issue a default block, e.g., after a regular period of inactivity on the secondary blockchain. The result of this may be that some of the blockchain management devices may adopt a different default block than other blockchain management devices. However, this will be resolved in the usual manner using the longest chain rule. To alleviate the overhead such an event might cause, a random delay may be added to the time the next block is expected or the default block created. For example, a blockchain management device may add a random time interval, e.g., chosen within a longer interval, e.g., from within a minute, to the next block time. As a result, many of the management devices will receive a default block before creating one. Once a new block is received, even a default one, a new period for waiting for the next block starts. If some transactions have been received, but fewer than usual are included in a new block, a new block with fewer transactions is created rather than a default block. Another way to avoid races is to include a proof of work consensus proof in the default block. For example, the default block could have a lower difficulty target than a regular block. A default block may comprise a nonce, a unique number.

An advantage of using default blocks is that users of the secondary blockchain can positively identify if the secondary blockchain is still alive and maintained. Especially for blockchains on which there is relatively little activity, this is an advantage.

In an embodiment, the creation of new blocks for the primary, e.g., root blockchain, and secondary blockchains are synchronized. This has the advantage that interrogating the primary blockchain gives information on the status of the secondary blockchain. But there might be implementations where this behavior will not take place. For example, a secondary blockchain may choose to create a new block every 60 minutes whereas the primary blockchain creates a new one every 10 minutes. This could potentially impose a problem since there would be no way to know by interrogating the primary blockchain if the secondary blockchain is in faulty status or not. But with the addition of a new block creation timer, it is known when a new block on the secondary blockchain can be expected. The secondary blockchain may broadcast the time after which a new block would be created. The new block could also be without any data, e.g., only created to honor the agreement. If the primary blockchain does not receive any new information from the secondary blockchain within the expected time, e.g., in the predefined new block creation time, then the status of the secondary blockchain may be set to 'Suspend'.

Embodiments use the primary blockchain also to record other events of the secondary blockchain. For example, in an embodiment, an initial block in the secondary blockchain is a genesis block, a transaction may be distributed to the at least one blockchain management device that manages the primary blockchain, said transaction comprising an identification of the genesis block. In other word, one can verify on the primary blockchain also that the secondary blockchain was created. It is not necessary that the genesis event is recorded on the primary blockchain. For example, one may start adding transactions to a primary blockchain for an existing secondary blockchain. In that case, newly created blocks can be verified on the primary blockchain, but older blocks cannot.

In an embodiment, the blockchain management device includes in the transaction a signature, e.g., with a private key of the blockchain management device. The signature can be verified by the primary blockchain management device to verify that the transaction really came from a secondary blockchain management device. For example, the private key may correspond to a public key, e.g., in a certificate, which is known to the primary blockchain management device. This helps against fake transactions on the primary blockchain device. It is not necessary though, for example, transactions on the primary blockchain that do not correspond to a secondary blockchain device may be ignored. Even if an unrelated party, say an attacker, were to post a transaction to a primary blockchain with a correct identification of a block on the secondary blockchain, this need not be a problem, since the transaction still proves that at the time the transaction is posted to the primary blockchain, the secondary block was in existence. This can be improved by computing the identification over the consensus proof in the secondary block.

Figure 2A:
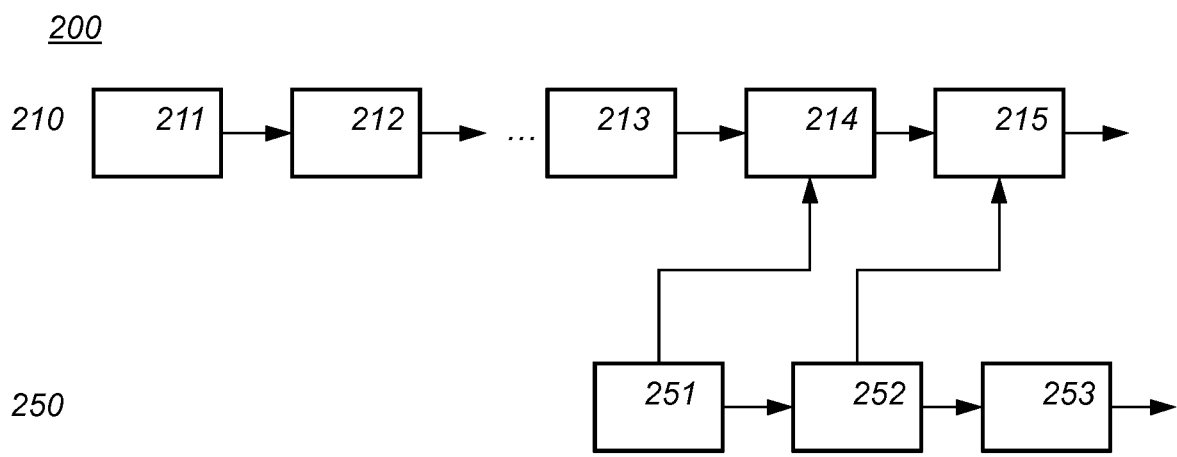

FIG. 2a schematically shows an example of an embodiment of a blockchain system 200. FIG. 2a shows the blockchains used in system 200. For example, these blockchains may also be used for system 180. Shown in FIG. 2a is a primary blockchain 210 and a secondary blockchain 250. There may be more primary and/or secondary blockchains. Primary blockchain 210 comprises multiple blocks; shown are blocks 211, 212, 213, 214 and 215. The first block 211 is known as the genesis block. Each block refers back to the previous block in the chain. This is illustrated with arrows between the blocks. For example, block 212 refers back to block 211, block 214 refers back to block 213, and so on. Referring back can be done in a variety of ways, e.g., by including some part of the previous block, e.g., an identifier or its consensus proof, or value computed over the previous block, e.g., a hash, a signature, etc.

The primary blockchain may have as its primary purpose to validate one or multiple secondary blockchains, such as blockchain 250, but may also primarily be used for something else, e.g., a cryptocurrency or the like. In the latter case, transactions that encode events on the secondary blockchain may be encoded in some manner, e.g., as a fake payment, etc.

For example, in an embodiment a system for recording of transactions is provided, in which the system comprises a primary blockchain management device, and one or more secondary blockchain management devices, the one or more secondary blockchain management devices distributing transactions that indicate a new block on their secondary blockchain to the primary blockchain. For example, use devices may use the system to record transactions, e.g., transactions that transfer or that record data, etc. For example, verification devices may use the system to verify the secondary blockchain using the primary blockchain.

FIG. 2a show a secondary blockchain 250. Of secondary blockchain 250 the blocks 251, 252 and 253 are shown. In both blockchains 210 and 250 there may be more or fewer blocks than shown in FIG. 2a. Locally, secondary blockchain 250 behaves much as a regular blockchain. For example, blockchain 250 comprises a genesis block 251. Moreover, blocks refer back to a previous block, in a similar manner as in blockchain 210, e.g., by including a reference to the previous block. For example, block 252 may comprise a reference to block 251, and so on.

The blocks created on the secondary blockchain 250 are recorded in a transaction on primary blockchain 210, as indicated by arrows from blockchain 250 to blockchain 210. For example, after block 252 is created an identification of block 252 may be recorded in block 215. When block 253 is created, a transaction may be sent, which will be included in a next block of blockchain 210. It may happen, that a transaction sent for recordation in a primary blockchain will not immediately show up in the very next block. For example, there may be high traffic on the primary blockchain, which may cause some delay in recording the transaction on the primary blockchain 210. Likewise, the rate at which blocks are created in the primary blockchain may be larger than the rate with which they are created in the secondary blockchain 250. This may lead to there being some blocks on the primary blockchain 210 which do not comprise a reference to a block in the secondary blockchain. The latter possibility is illustrated in FIG. 2d. In FIG. 2d, block 251 and block 252 are recorded in blocks 214 and 215 on the primary blockchain, but there are blocks between blocks 214 and 215.

Another possibility is that not all blocks of the secondary blockchain are recorded in the primary blockchain. This option is illustrated in FIG. 2e. Blocks 251 and 253 of secondary blockchain 250 are recorded as transactions in blocks 213 and 215 on the primary blockchain 210, but block 252 of the secondary blockchain is not recorded. This reduces pressure on the primary blockchain. For a user, the impact is limited though, although he cannot directly verify the creation of block 252 on the primary blockchain 210, he can verify the creation of blocks 251 and 253. Since block 253 refers back to block 251 through block 252 this gives good assurance that block 252 was validly created as well.

Figures 2B, 2C:
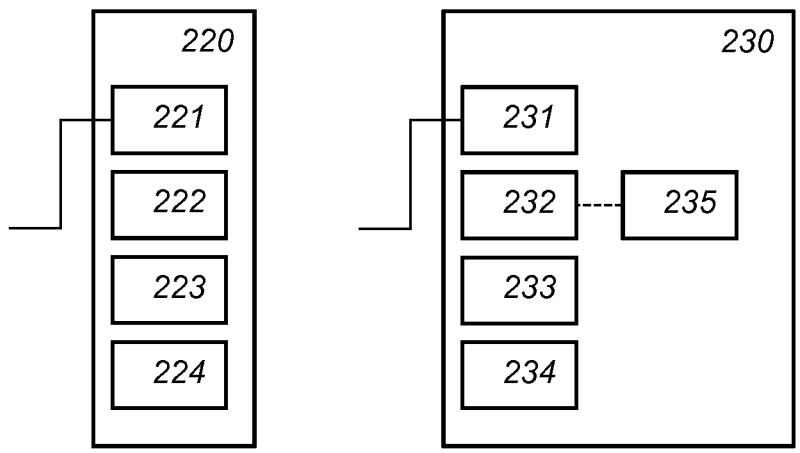
Figure 2D:
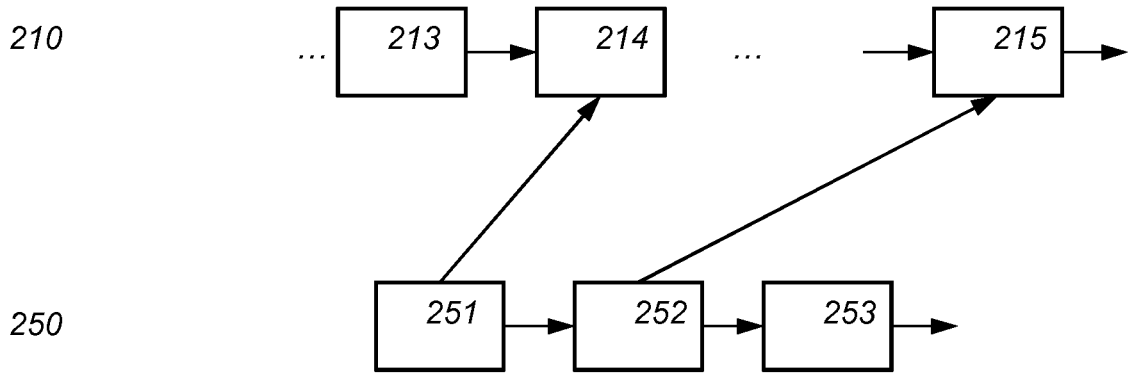
Figure 2E:
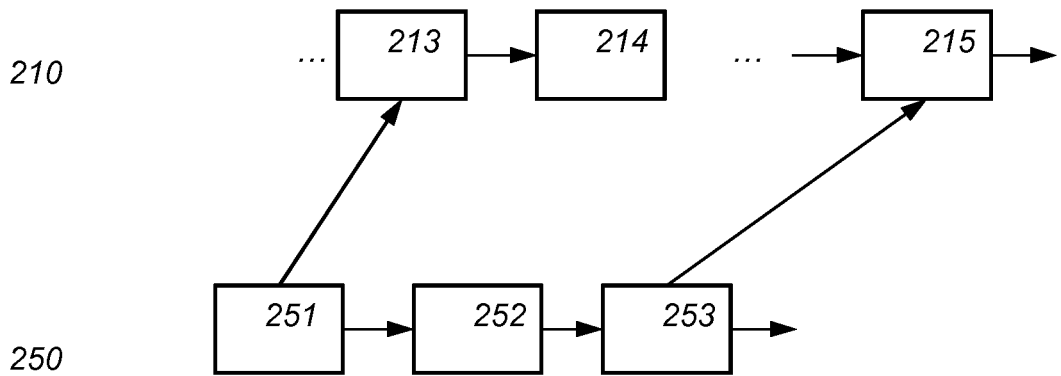
Figure 2F:
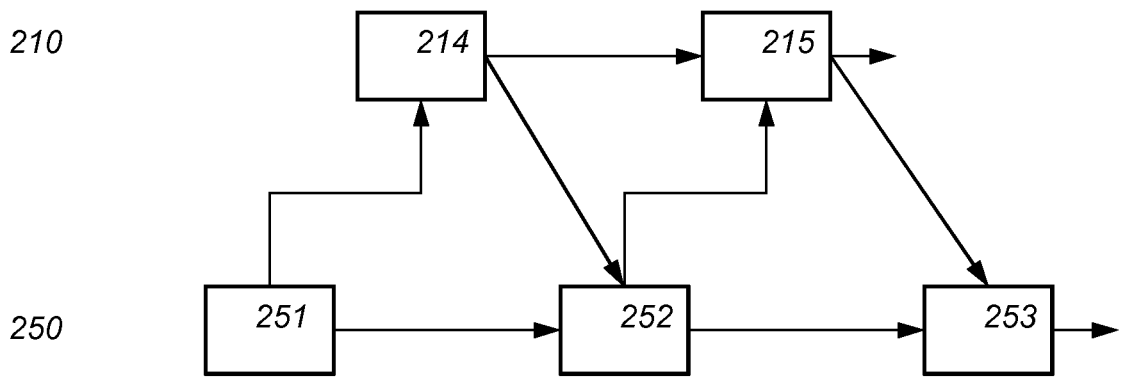

Yet a further option is illustrated in FIG. 2f. In FIG. 2f, blocks of blockchain 250 are recorded on the blockchain 210, e.g., as identifications. In particular, blocks 251 and 252 are recorded as transactions in blocks of the blockchain 210 that are created later, in this case in blocks 214 and 215 respectively. In other words, from the perspective of blockchain 250: blockchain 250 is the secondary blockchain and blockchain 210 is the primary blockchain. However, blockchain 210 may use blockchain 250 to record its blockchain events, e.g., the creation of blocks. In particular, blocks 214 and 215 are recorded as transactions in blocks 252 and 253 respectively. In other words, from the perspective of blockchain 210: blockchain 250 is the primary blockchain and blockchain 210 is the secondary blockchain. There is no need to restrict this to two blockchains, for example, three or more blockchains could regard each other alternatively as primary or secondary blockchains. For example, in an embodiment, the blockchain management device may be configured to distribute a transaction to at least one blockchain management device that manages a primary blockchain, said transaction comprising an identification of the set of transactions in the new block, and also arranged to receive a further transaction from a different blockchain management device that manages a different blockchain, e.g., the primary blockchain, said transaction comprising an identification of the set of transactions in a new block of the different blockchain. The blockchain management device being configured to include the further transaction in a block on its blockchain.

FIG. 2b schematically shows an example of an embodiment of a block 220 which may, e.g., be included in a secondary blockchain, such as blockchain 250.

Secondary blockchain block 220 may comprise, e.g., a set of transactions 222. Set 222 may be empty, e.g., in case block 222 is a default block. Set 222 may comprise one or more transactions. Block 220 may comprise a consensus proof 223. Block 220 may comprise a reference 221 to a previous block on the secondary blockchain. Block 220 may comprise a block id 224, although this is not strictly necessary. There are other things that may or may not be included in block 220. For example, block 220 may comprise the identification, or part thereof, that is recorded on the primary blockchain.

FIG. 2c schematically shows an example of an embodiment of a block 230 which may, e.g., be included in a primary blockchain, such as blockchain 210.

Primary blockchain block 230 may comprise, e.g., a set of transactions 232. Set 232 may be empty or have one or more transactions. One of the transaction in set 232 may be a transaction 235 that records the creation of a block on the secondary blockchain, e.g., block 220. Block 230 may comprise a consensus proof 233. Block 230 may comprise a reference 231 to a previous block on the primary blockchain 210. Block 230 may comprise a block id 234, although this is not strictly necessary. There are other things that may or may not be included in block 230.

Figure 3A:
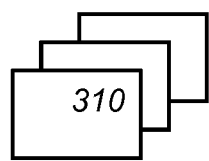
Figure 3A:
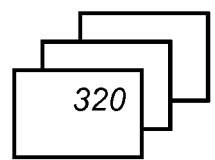
Figure 3A:
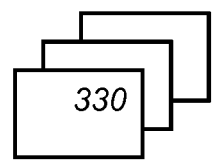
Figure 3A:
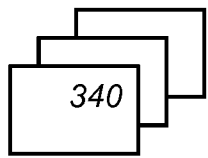
Figure 3A:
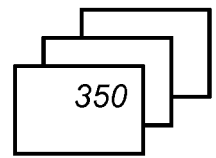
Figure 3A:
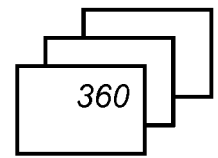
Figure 3A:
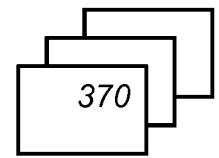

FIG. 3a schematically shows an example of an embodiment of a blockchain system 300. Embodiments provide a framework for implementing multiple blockchains in a hierarchical manner. Shown in FIG. 3a are three levels: a first level 301, a second level 302, and a third level 303. There may be more or fewer levels.

One blockchain on the first level 301 may be considered the 'Root' and the following one or multiple blockchains may be considered a child of the root and so forth. Shown in FIG. 3a is a root blockchain 310. In FIG. 3a the blockchains are depicted as blocks stacked on top of each other.

In the above picture the 'Root level' blockchain 310 is the one with the higher level in the hierarchy. Below the root blockchain 310, there may be several blockchain that record events, e.g., block creations, in the root blockchain 310. Shown are blockchains 320 and 330 on second level 302. These may be regarded as "Intermediate level" blockchains, and belong to the second level. There may be more blockchains on the second level. There may also be more root level blockchains.

FIG. 3a also shows third level blockchains, on level 303, which may be called the "Issuing level" blockchains belong to the last level. In this example, the blockchains which belong in the "Issuing level" may be the ones providing a service to the end user, but the higher blockchains are providing the information needed in order to assure a variety of attributes that aggregate to trustworthy blockchains.

Figure 3B:
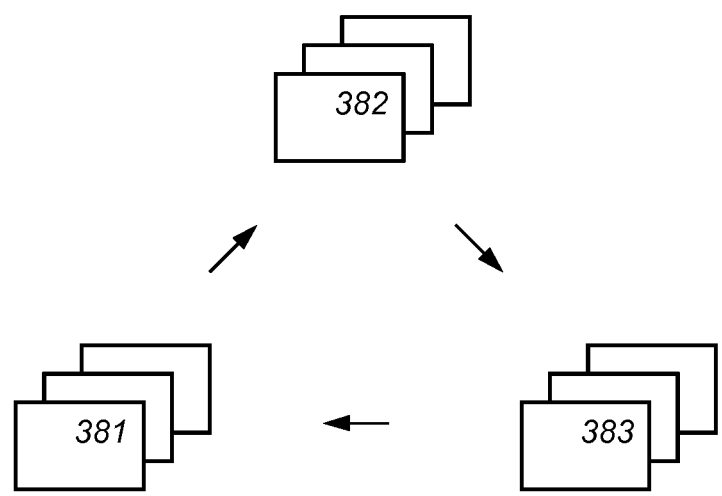

The configuration of FIG. 3a has the advantage of a clear hierarchical organization. There are alternative ways to organize block chains though. For example, consider FIG. 3b. FIG. 3b shows three blockchains: 381, 382 and 383. New blocks in blockchain 381 are recorded in blockchain 382. New blocks in blockchain 382 are recorded in blockchain 383. New blocks in blockchain 383 are recorded in blockchain 381. In other words, there are multiple blockchains that are organized in a non-tree, e.g., a not acyclic graph (e.g., a graph comprising at least one cycle), e.g., a cyclic graph. In an embodiment, the graph is directed with blockchains at the nodes; the edges indicating which blockchain records in which other blockchain. There is no need to restrict this to three blockchains, for example, four or more blockchains could regard each other alternatively as primary or secondary blockchains. This may have the advantage of more immutability and trust. For example, one party can verify transaction on a first private blockchain and a second party can verify transaction on a second private blockchain. This possibility can be further expanded.

Figure 3C:
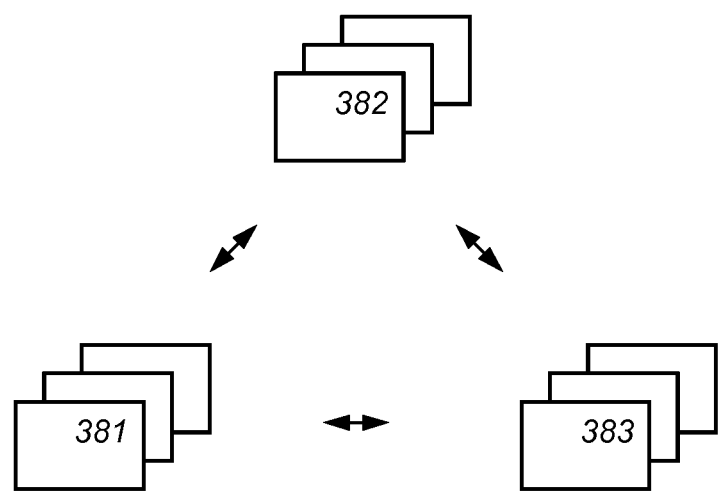

FIG. 3c shows an alternative in which blockchains record a new block in multiple other blockchains. FIG. 3c shows three blockchains: 381, 382 and 383. New blocks in blockchain 381 are recorded in blockchains 382 and 383. New blocks in blockchain 382 are recorded in blockchains 383 and 381. New blocks in blockchain 383 are recorded in blockchains 381 and 382. This organization of blockchains could be represented as a not acyclic directed graph, in which one, one or more or all nodes have an outgoing degree of at least 2.

Figure 3D:
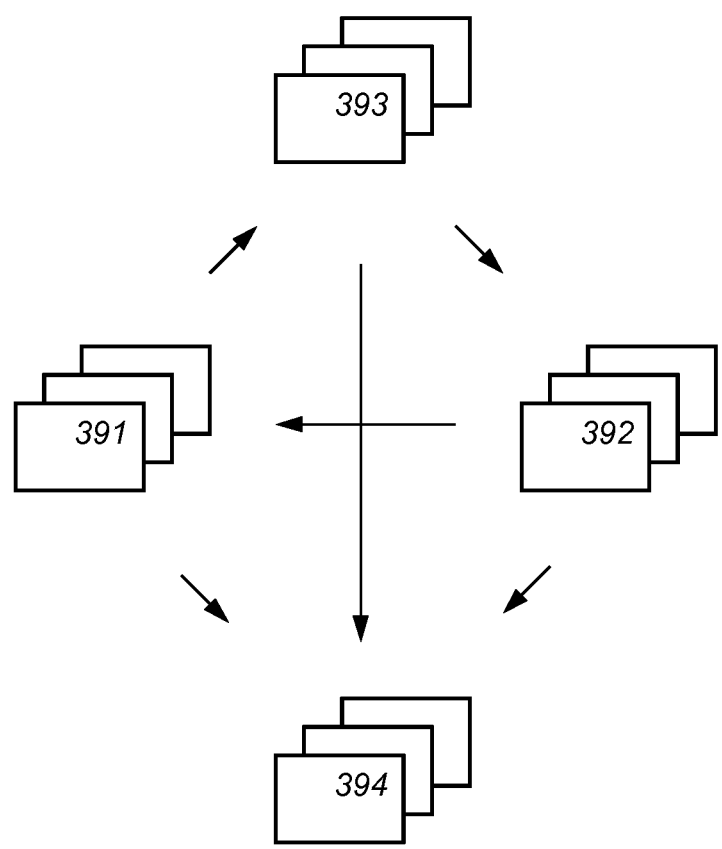

FIG. 3d shows an alternative in which blockchains record a new block in multiple other blockchains. Again, this enhances immutability and trust. Or this may be used for increased flexibility, e.g. because a transaction can be verified in multiple blockchains and there is flexibility to choose where and how many verifications to perform. FIG. 3d shows four blockchains: 391, 392, 393 and 394. New blocks in blockchain 391 are recorded in blockchains 393 and 394. New blocks in blockchain 392 are recorded in blockchains 391 and 394. New blocks in blockchain 393 are recorded in blockchains 392 and 394. This organization of blockchains could be also represented as a not acyclic directed graph, in which one, one or more nodes have an outgoing degree of at least 2. Note that all nodes record a new block in blockchain 394, which may be considered a root blockchain. Blockchain 394 itself does not use another blockchain for recording new blocks.

Blockchains may provide a means of executing transactions between untrusted partners without the need of a central authority. Using multiple blockchains does not conflict with that. For example, the root blockchain may be a blockchain for which the participants or the ecosystem agree that it can function as the primary blockchain. For example, the Bitcoin network can be used as root blockchain, or the public Ethereum network, etc. Any of the blockchains could be public or private, in particular the secondary ('Intermediate') or third ('Issuing') can be either public or private blockchain implementations. An example of a use case is the following. A company may want to use Bitcoin transactions as the payment system, a private blockchain based on Ethereum for the logistics and a third blockchain for the validation of the whole process. The primary and/or secondary blockchain could be run as a service, e.g., to assure the validity of a public or private blockchain.

For example, in an embodiment using three levels, the root level may be a public blockchain, e.g., e well-known blockchain, the second level may be a service providing company that provides validation services for blockchains. The third level may be blockchains of clients of the service providing company. Typically, the latter will be private blockchains, the second level blockchains may be public or private.

A multilayered solution is thus presented in order for a secondary blockchain to be able to register its contents on a primary blockchain. This gives then a third party (an end client or a process for example) the opportunity to check if the data received or presented (depends on the type of application) from the secondary blockchain is trustworthy. An end customer can check if the data is valid by running a check in the primary blockchain which might only hold the hashes of blocks from secondary blockchains thus acting as the checkpoint for all interested parties.

An example of this application is the following: Company A buys mobile devices from company B and then sells them to consumers. A consumer visits one of the shops of company A and wants to check the production date of a mobile device. She scans the barcode (or IMEI or any other distinct identity) and a check is done on her behalf. This check involves checking the hashed data of the secondary blockchain of company A with the data stored in the root blockchain of company B. If the data is valid, the correct date is shown to the end customer.

FIG. 4 schematically shows an example of an embodiment of a blockchain verification device 500. In addition to the communication interface 510, blockchain verification device 500 comprises a verification unit 520, and a blockchain storage 570. The blockchain storage 570 comprises the current state of the blockchain. In particular, storage 570 may comprise both the primary and secondary blockchain, e.g., chains 210 and 250.

In an embodiment, blockchain verification device 500 is arranged with a blockchain browser. The blockchain browser providing a user interface for browsing the blockchains. The user interface may also receive a request to search for transactions, and the like. In an embodiment, blockchain verification device 500 may be arranged to receive requests for part of the blockchains. For example, a blockchain use device may request blocks of the blockchains.

For example, blockchain verification device 500 may be configured to receive new blocks, e.g., from blockchain management devices, verify the blocks and store them in the blockchain storage 570. Blockchain verification device 500 may employ some tie-breaking rule in case multiple conflicting blocks are received. The tie breaking may be the so-called longest chain rule.

The verifying of verification unit 520 may comprise the conventional verification checking for the blockchains: For example, verifying the consensus proof, verifying that first and second halves of transactions correctly execute as blockchain scripts, and so on. Verification unit 520 may also perform verification specific to multiple blockchains. For example, after receiving a block of the primary blockchain, verification unit 520 may determine if the block comprises a transaction that indicates a new block on the secondary blockchain. For example, a block from the secondary blockchain can be used to compute the identification of the secondary block. The verification device may verify that the identification is present in a transaction of the primary block. In that case, the blockchain may verify if the corresponding secondary block actually exits. Depending on the application, verification device 500 may, e.g., reject a block on primary blockchain having such a transaction as illegal, and refuse to add it to the primary blockchain. In an embodiment, device 500 may have a block pool (a storage or memory) for temporarily keeping a block of the primary blockchain, since it may happen that the primary block with the transaction is received before the corresponding secondary block. Likewise, if device 500 receives a secondary block, verification unit 520 may verify that a corresponding transaction is recorded on the primary blockchain. Also in this case, a secondary block should not immediately be discarded but also kept for some period, since the corresponding primary block may arrive some time later. For example, the pool may keep the primary or secondary blocks for an hour or more, or a day or more, etc. Discarded blocks may be kept if desired, e.g., in an archive.

FIG. 5 schematically shows an example of an embodiment of a blockchain use device 400. In addition to the communication interface 410, device 400 comprises a block obtainer 420, and a transaction verifier 430. Blockchain use device 400 may be configured to perform only minimal verification before accepting a transaction. For example, use device 400 may receive a transaction, e.g., from another blockchain use device. The transaction may comprise a transaction input referring to an earlier transaction. For example, the transaction transfers currency or some other goods to an account under control of the owner of the blockchain use device 400. Blockchain use device 400 is arranged to verify that the transaction input, e.g., to verify that the transaction is actually correct, and not, e.g., a double spending.

For example, block obtainer 420 may be configured to obtain at least part of a block from a secondary blockchain comprising said earlier transaction. The block may comprise multiple transactions including the earlier transaction, and a consensus proof. Instead of a full block also part of the block may be received, e.g., together with a corresponding partial hash, e.g., according to a Merkle tree. Using the received block, the validity of the transaction can be verified. Block obtainer 420 may also obtain at least part of a block from a primary blockchain comprising an identification of the block of the secondary blockchain, verify the validity of the block from the secondary blockchain using the obtained part of the block from the first blockchain. For example, in an embodiment, the block from the secondary blockchain is received in full, but the block from the primary blockchain is received only in part, e.g., using a Merkle tree. In this case, the full block from the secondary blockchain can be used to compute the identification of the secondary bock. The use device may verify that the identification is present in a transaction of the primary block. The blockchain use device may be arranged to derive the identification based on the block from the secondary blockchain, e.g., as a hash over at least the set of transactions. However, there may be various ways to find the corresponding block in the primary blockchain, e.g., a timestamp, a block Id, etc.

In the various embodiments of the blockchain management device 100, blockchain verification device 500, blockchain use device 400, the communication interface may be selected from various alternatives. For example, the communication interface may be a network interface to a local or wide area network, e.g., the Internet. Alternatively, a system 180 may be implemented over other technology. For example, communication interface may be a storage interface to an internal or external data storage, an application interface (API), etc.

The blockchain management device 100, blockchain verification device 500, and/or blockchain use device 400 may have a user interface, which may include well-known elements such as one or more buttons, a keyboard, display, touch screen, etc. The user interface may be arranged for accommodating user interaction for performing, e.g., a transaction, a verification, a block management.

Storage, e.g., for storing a blockchain may be implemented as an electronic memory, say a flash memory, or magnetic memory, say hard disk or the like. Storage may comprise multiple discrete memories together making up storage. Storage may also be a temporary memory, say a RAM. In the case of a temporary storage, storage contains some means to obtain data before use, say by obtaining them over an optional network connection (not shown).

Typically, the blockchain management device 100, blockchain verification device 500, and blockchain use device 400 each comprise a microprocessor (not separately shown in FIGS. 1, 4 and 5) which executes appropriate software stored at the device; for example, that software may have been downloaded and/or stored in a corresponding memory, e.g., a volatile memory such as RAM or a non-volatile memory such as Flash (not separately shown). Alternatively, the blockchain management device 100, blockchain verification device 500, and blockchain use device 400 devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the devices are implemented as one or more circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 6A:
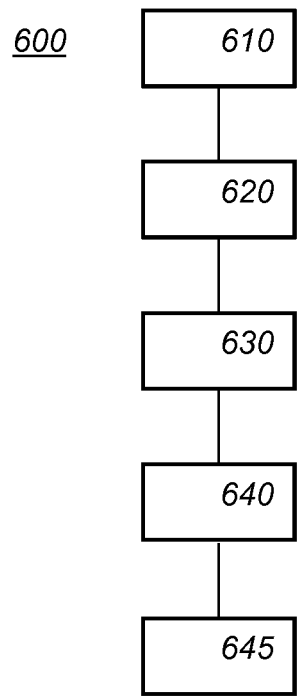

FIG. 6a schematically shows an example of an embodiment of a blockchain management method 600. Method 600 comprises receiving (610) digital transactions for recording in a secondary blockchain, obtaining (620) a consensus proof for a set of received transactions, assembling (630) a new block for inclusion in the secondary blockchain, the new block comprising the set of transactions, the consensus proof, and a reference to a previous block on the secondary blockchain, distributing (640) the new block over the communication interface to a blockchain management device that manages the secondary blockchain, distributing (645) a transaction to at least one blockchain management device that manages a primary blockchain, said transaction comprising an identification of the set of transactions in the new block.

Figure 6B:
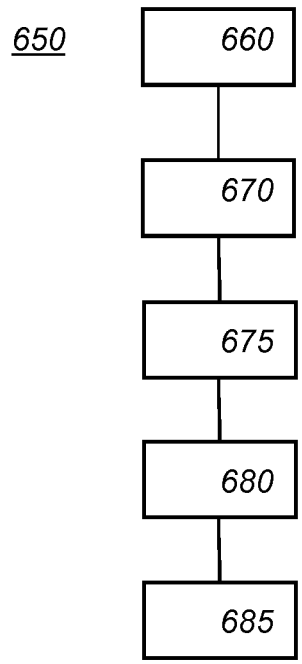

FIG. 6b schematically shows an example of an embodiment of a blockchain use method 650. Method 650 comprises receiving (660) a digital transaction, said transaction having a transaction input referring to an earlier transaction, obtaining (670) at least part of a block from a secondary blockchain comprising said earlier transaction, the obtained part comprising the earlier transaction and an identification of the block, verifying (675) the validity of the transaction using the obtained part, obtaining (680) at least part of a block from a primary blockchain comprising an identification of the block of the secondary blockchain, verifying (685) the validity of the block from the secondary blockchain using the obtained part of the block from the first blockchain.

Figure 6C:
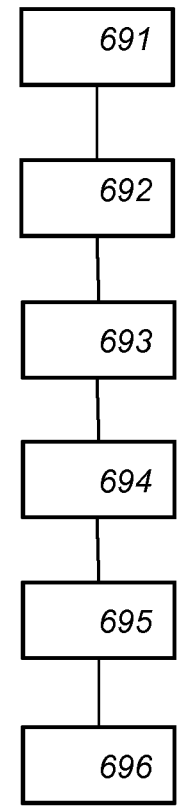

FIG. 6c schematically shows an example of an embodiment of a blockchain verification method 690. Method 690 comprises receiving (691) a primary block for a primary blockchain and a secondary block for a secondary blockchain, storing (692) the primary blockchain and the secondary blockchain, verifying (693) the received primary block and secondary block determining (694) if the primary block comprises a transaction that indicates a new block on the secondary block.

verifying (695) that the transaction corresponds to the received secondary block, storing (696) the primary and secondary blocks in the storage (570).

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

A method according to the invention may be executed using software, which comprises instructions for causing a processor system to perform methods 600, 650, 690. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
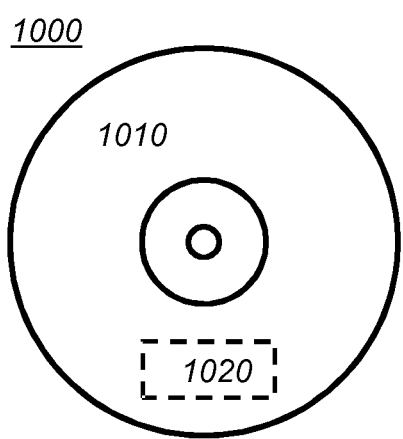

FIG. 7a shows a computer readable medium 1000 having a writable part 1010 comprising a computer program 1020, the computer program 1020 comprising instructions for causing a processor system to perform a method of blockchain management, verification or use according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of blockchain management, verification or use.

Figure 7B:
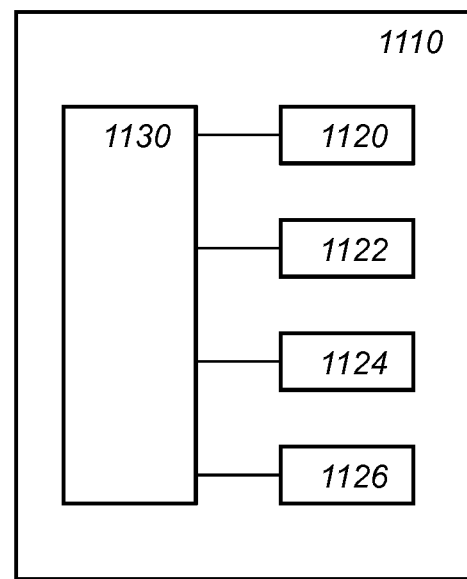

FIG. 7b shows in a schematic representation of a processor system 1140 according to an embodiment of a blockchain management, verification or use device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the blockchain management, verification or use device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:
1. A blockchain management device comprising:
a communication interface arranged to receive digital transactions for recording in a secondary blockchain,
a processor circuit configured to:
broadcast a time before which a new block will be created,
obtain a consensus proof for a set of transactions received over the communication interface,
assemble a new block for inclusion in the secondary blockchain, the new block comprising the set of transactions, the consensus proof, and a reference to a previous block on the secondary blockchain,
distribute the new block before the broadcasted time over the communication interface to at least one further blockchain management device that manages the secondary blockchain,
distribute a transaction at the time to at least one blockchain management device that manages a primary blockchain, said transaction comprising an identification of the set of transactions in the new block.

2. A blockchain management device as in claim 1, wherein the identification comprises
a hash over at least the set of transactions, and/or
a hash over an identification of a previous block in the secondary blockchain.

3. A blockchain management device as in claim 1, wherein the new block comprises the identification.

4. A blockchain management device as in claim 1, wherein the identification comprises a hash over the new block.

5. A blockchain management device as in claim 1, wherein the distribution of new blocks is synchronized to the distribution of new blocks in the primary blockchain.

6. A blockchain management device as in claim 5, wherein an expected time to obtain a consensus proof for the primary blockchain is larger than the expected time to obtain a consensus proof for the secondary blockchain.

7. A blockchain management device as in claim 1, wherein the processor circuit is configured to, if no valid transaction were received in time for the new block, assemble a default block without valid transactions.

8. A blockchain management device as in claim 1, wherein an initial block in the secondary blockchain is a genesis block, a transaction being distributed to the at least one blockchain management device that manages the primary blockchain, said transaction comprising an identification of the genesis block.

9. A blockchain management device as in claim 1, wherein the transaction comprises a signature of the blockchain management device.

10. A blockchain management method, the method comprising:
receiving digital transactions for recording in a secondary blockchain,
broadcasting a time before which a new block will be created,
obtaining a consensus proof for a set of received transactions,
assembling a new block for inclusion in the secondary blockchain, the new block comprising the set of transactions, the consensus proof, and a reference to a previous block on the secondary blockchain,
distributing the new block before the broadcasted time over the communication interface to a blockchain management device that manages the secondary blockchain,
distributing a transaction at the time to at least one blockchain management device that manages a primary blockchain, said transaction comprising an identification of the set of transactions in the new block.

11. A computer readable medium comprising non-transitory data representing instructions to cause a processor system to perform the method according to claim 10.

12. A blockchain management method as in claim 10, wherein the identification comprises:
a hash over at least the set of transactions, and/or
a hash over an identification of a previous block in the secondary blockchain.

13. A blockchain management method as in claim 10, wherein the new block comprises the identification.

14. A blockchain management method as in claim 10, wherein the identification comprises a hash over the new block.

15. A blockchain management method as in claim 10, further comprising, if no valid transaction were received in time for the new block, assembling a default block without valid transactions.

16. A blockchain management method as in claim 10, wherein an initial block in the secondary blockchain is a genesis block, the method further comprising distributing a transaction to the at least one blockchain management device that manages the primary blockchain, said transaction comprising an identification of the genesis block.

17. A blockchain management device comprising:
a communication interface arranged to receive digital transactions for recording in a secondary blockchain,
a processor circuit configured to:
obtain a consensus proof for a set of transactions received over the communication interface,
assemble a new block for inclusion in the secondary blockchain, the new block comprising the set of transactions, the consensus proof, and a reference to a previous block on the secondary blockchain,
distribute the new block over the communication interface to at least one further blockchain management device that manages the secondary blockchain,
distribute a transaction to at least one blockchain management device that manages a primary blockchain, said transaction comprising an identification of the set of transactions in the new block;
wherein the distribution of new blocks is synchronized to the distribution of new blocks in the primary blockchain; and
wherein an expected time to obtain a consensus proof for the primary blockchain is larger than the expected time to obtain a consensus proof for the secondary blockchain.

18. A blockchain management method, the method comprising:
receiving digital transactions for recording in a secondary blockchain,
obtaining a consensus proof for a set of received transactions,
assembling a new block for inclusion in the secondary blockchain, the new block comprising the set of transactions, the consensus proof, and a reference to a previous block on the secondary blockchain,
distributing the new block over the communication interface to a blockchain management device that manages the secondary blockchain,
distributing a transaction to at least one blockchain management device that manages a primary blockchain, said transaction comprising an identification of the set of transactions in the new block;
wherein the distribution of new blocks is synchronized to the distribution of new blocks in the primary blockchain; and
wherein an expected time to obtain a consensus proof for the primary blockchain is larger than the expected time to obtain a consensus proof for the secondary blockchain.

* * * * *